(12) United States Patent
Knauer

(10) Patent No.: X8421
(45) Date of Patent: Sep. 25, 1834

(54) THRASHING, & CORN SHELLING MACHINE

(76) Inventor: David Knauer

The schedule referred to in these Letters Patent, and ma-
king part of the same containing a description in the
words of the said David Knauer himself of his improve
ment being a machine for separating all kinds of
grain and seeds from the straw & husk, and for clean-
ing the same, called Knauers Thrashing & Corn shelling
machine

---

To all to whom these Presents shall come
Be it known that I David Knauer, of Chester
County State of Pennsylvania have made im-
provements in the useful arts, being a machine
for separating all kinds of grain and seeds from
the straw and husk, and for cleaning the same; also
shelling corn called Knauers thrashing cleaning
and corn shelling machine, which is descri-
bed as follows reference being had to the annex-
ed drawings.

The machine for separating seed and grain
from the straw and husk marked A, consists of a
revolving cylinder of beaters and a stationary box,
with an inclined vibrating screen for separating
the straw from the grain, and a fan for clean-
ing.

The revolving beaters B, are made of wood
faced with iron or entirely of iron, and are formed
into a cylinder by their ends being fixed in
circular heads D. This cylinder turns on an
axle E resting on anti-friction wheels F upon
the frame. On one end of this axle is a whirl G, for
giving motion to it by a band H passing round
[illegible] the main driving Pulley I. The bed K.

United States Patent
Patent No.: X8421
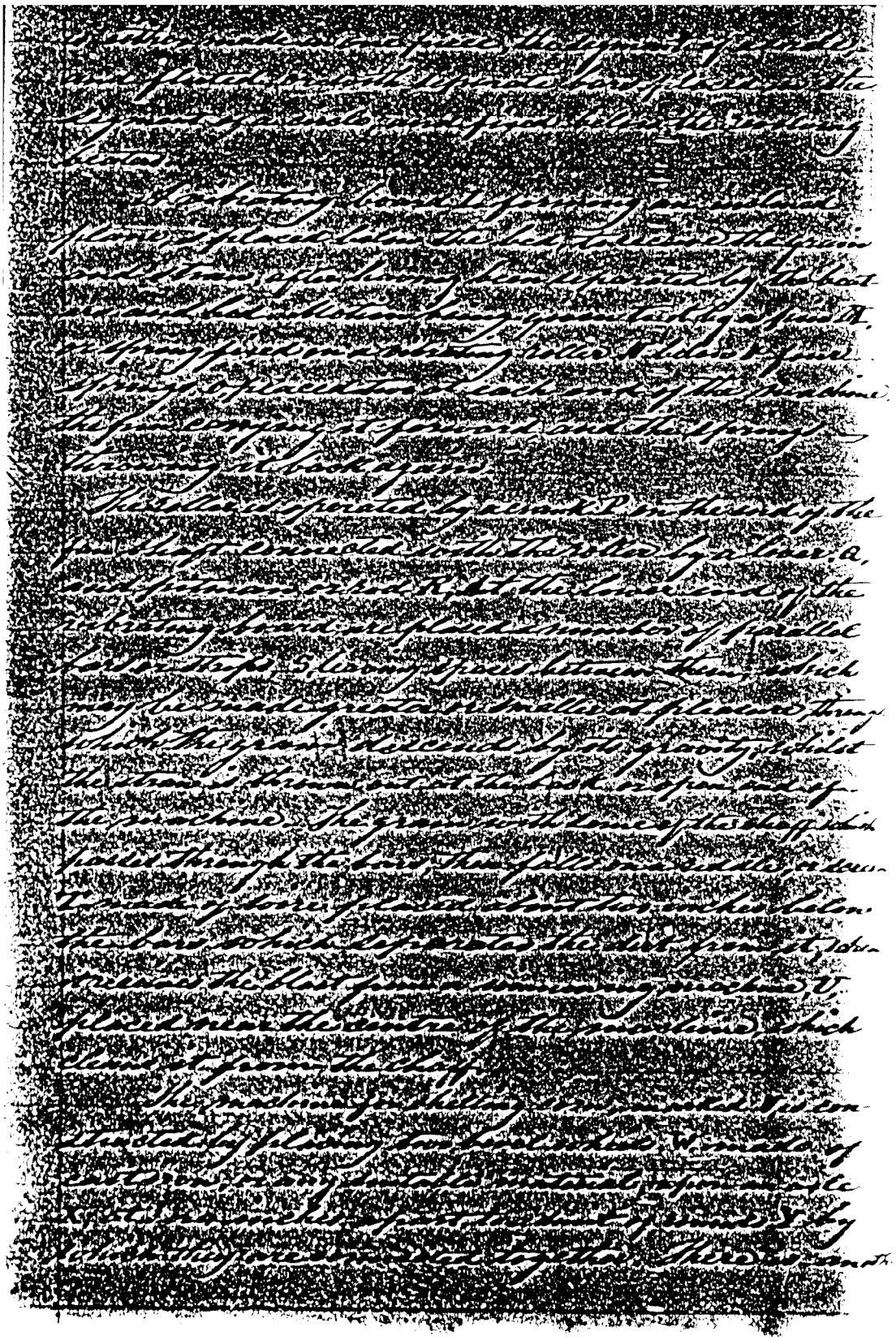

a plate placed above the former, in the centre of which
is fixed a cog wheel B working into the rounds of the
before mentioned bevel wheels and which gives motion
to them. This cog wheel is cast solid having points or
projections cast on each side, which work sufficiently
near the projections on the two bevel wheels, and by which
the corn is rubbed out or shelled. The ears of corn are
introduced by the hand into the openings, by which it
is conducted to the bevel wheels to be rubbed out. There
are two springs, b, one over each bevel wheel for
holding down the ears of corn, and connected with
the cover.

Operation of the grain thrashing machine

The grain to be thrashed is placed upon an
inclined board d, motion is given to the main wheel
or driving pulley by any convenient power, the grain
and straw are drawn in by the revolving beaters,
by means of which and the bed, the grain is sep-
arated from the straw, the grain and straw
then fall on the inclined vibrating board, the grain
falling through between the bars on to the riddle,
and the straw thrown out at the end: it then falls
upon another inclined plane e, placed below
in a inverted position, where it is subjected to a winnow-
ing machine which thoroughly cleans it. There is an-
other inclined board f, immediately behind the one
marked e, which catches the grain that escapes it.
The grain is then received by an inclined spout or
shoot g, lying across the bottom of the machine
at the lower end of the inclined plane e, which
conveys the grain out at the side of the machine to
[illegible]. Operation of the corn shelling machine

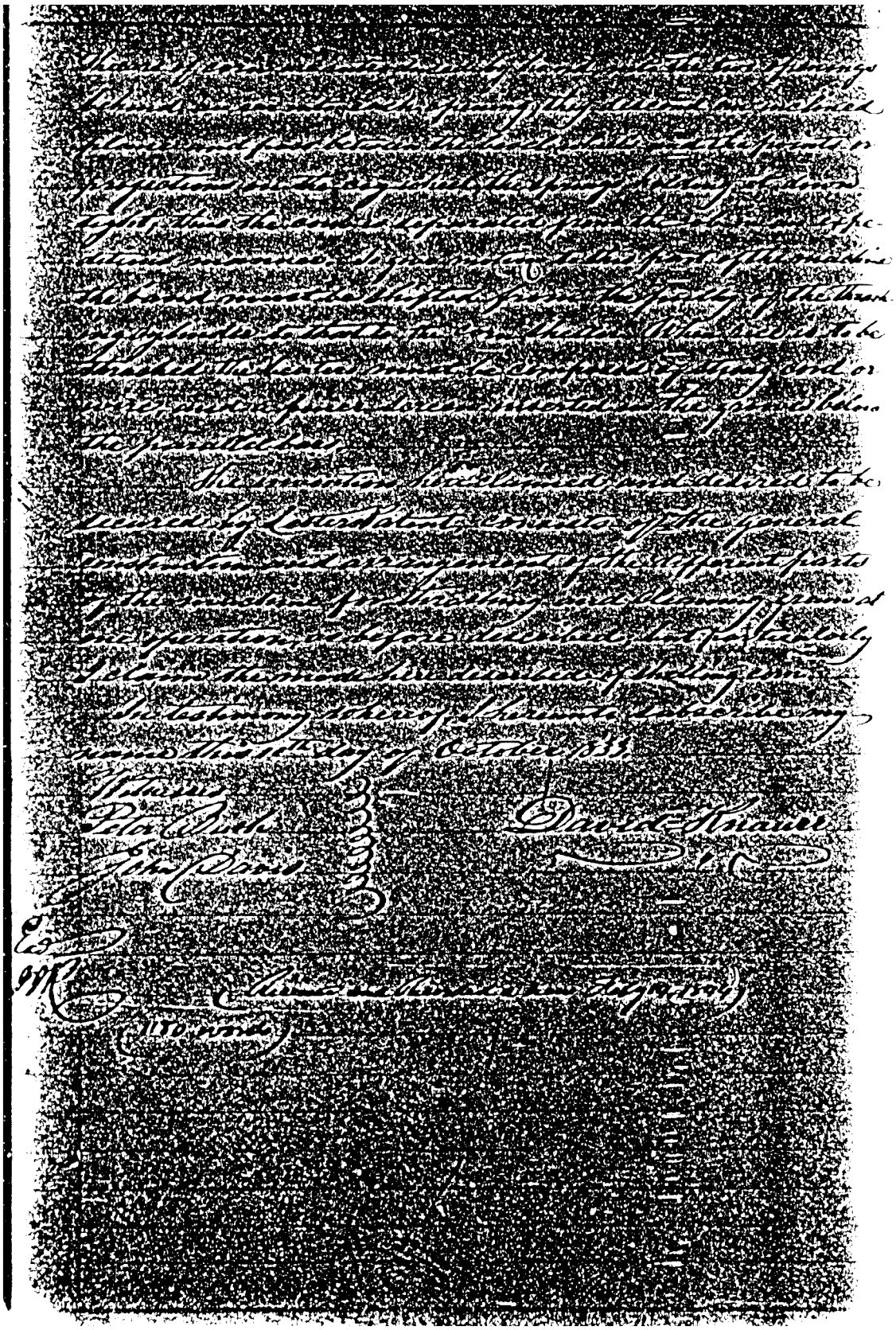

United States Patent
Patent No.: X8421